United States Patent [19]
Krupinski et al.

[11] Patent Number: 5,874,525
[45] Date of Patent: Feb. 23, 1999

[54] DEVOLATILIZER TRAY ARRAY

[75] Inventors: Steven M. Krupinski, West Boylston; Douglas DesRoches, Leominster, both of Mass.

[73] Assignee: Nova Chemicals Inc., Leominster, Mass.

[21] Appl. No.: 788,656

[22] Filed: Jan. 24, 1997

[51] Int. Cl.$^6$ ........................................................ C08F 6/28
[52] U.S. Cl. ...................... 528/502 R; 528/481; 528/483; 528/496; 528/499; 528/501; 159/22; 159/32; 159/47.1; 159/DIG. 16; 264/102; 427/203
[58] Field of Search ................................ 528/501, 502 R, 528/481, 483, 496, 499; 427/203; 159/22, 32, 47.1, DIG. 16; 264/102

[56] References Cited

U.S. PATENT DOCUMENTS

| | | | |
|---|---|---|---|
| 3,658,946 | 4/1972 | Bronstert et al. | 260/878 |
| 3,660,535 | 5/1972 | Finch et al. | 260/880 |
| 3,694,535 | 9/1972 | Kimoto et al. | 264/102 |
| 3,747,304 | 7/1973 | Elmer et al. | 55/178 |
| 3,886,049 | 5/1975 | Bir et al. | 203/9 |
| 3,903,202 | 9/1975 | Carter et al. | 260/880 |
| 4,808,262 | 2/1989 | Aneja et al. | 528/501 X |
| 4,934,433 | 6/1990 | Aboul-Nasr | 159/43.1 |
| 5,024,728 | 6/1991 | Morita et al. | 528/501 X |
| 5,069,750 | 12/1991 | Aboul-Nasr | 159/2.001 |
| 5,118,388 | 6/1992 | Aboul-Nasr | 159/2.1 |
| 5,350,813 | 9/1994 | Skilbeck | 528/493 |
| 5,380,822 | 1/1995 | Skilbeck | 528/499 |

*Primary Examiner*—Fred Teskin

[57] ABSTRACT

The residual level of monomer in a polymer may be reduced by passing a melt of the polymer through a devolatilizer column which contains an array of two or more trays having voids comprising from 15 to 50% of the surface of the tray which are offset so the voids in the upper tray are spaced over the solid areas of the tray below.

12 Claims, 2 Drawing Sheets

DEVOLATILIZER TRAY ARRAY

FIELD OF THE INVENTION

The present invention relates to an array of devolatilizer trays to be used for the devolatilization of a viscous fluid containing one or more volatile components. More particularly the present invention relates to an array of distributor trays which may be used in falling strand devolatilizers to reduce the residual monomer content in the polymer being devolatilized.

BACKGROUND OF THE INVENTION

In the bulk or solution polymerization of one or more monomers, it is generally necessary to remove unreacted monomer, dimers, trimers, oligomers, and diluent if present from the resulting polymer. There are in theory and practice a number of processes for reducing the residual content of volatile material in the polymer melt.

In the technique to which the present invention relates, a polymer melt from the reactor is pumped by a gear pump or other suitable means to a heater (sometimes called a preheater) on top of a vertical vacuum chamber (i.e. devolatilizer). The heater is typically a shell and tube type heat exchanger. The polymer melt leaving the heater may be forced through many fine holes of a distributor showerhead. Typically the hole diameter ranges from $\frac{1}{32}$ of an inch to $\frac{1}{8}$ of an inch. The strands of polymer melt which are formed descend towards the bottom of the vacuum chamber (hence, the name, a falling strand devolatilizer). The showerhead extrudes the polymer melt as fine strands to lower the diffusion path distance. (The characteristic time for diffusion is defined by the equation $\lambda_D = r^2/D$ where $\lambda_D$ is the diffusion time, r is the radius of the strand and D is the diffusion coefficient.) The residual monomer and, if present, diluent, and dimers and trimers devolatilize out of the descending or falling polymer strands as they are exposed to the vacuum (and it is maintained) causing the polymer to foam. The polymer melt which collects at the base of the devolatilizer is then forwarded to the stranding and pelletization unit operations.

The preheater, showerhead distributor, and devolatilizer are maintained at an elevated temperature to reduce the viscosity of the polymer melt. The increase in temperature also increases the vapor pressure which increases the mole fraction of volatiles in the vapor phase (i.e. $y_i P = \delta_i x_i P_i^{vap}$ wherein $y_i$ is the mole fraction of the volatile component in the vapour phase; P is the system pressure; $\delta_i$ is the activity coefficient of the volatile component; $x_i$ is the mole fraction of the volatile component in the melt phase; and $P_i^{vap}$ is the vapour pressure of the volatile component). This permits the bubbles of volatile material to diffuse or rise to the surface of the strands of polymer melt more rapidly. However, reducing the viscosity of the polymer melt increases the rate at which the polymer flows in the form of a strand to the bottom of the devolatilizer and correspondingly reduces the residence time of the polymer melt in the vacuum chamber. There is a need for a method to increase the residence time of the polymer melt in the falling strand vacuum chamber devolatilizer.

There are a number of devices which may be used to increase the residence time of a polymer melt in a vacuum chamber devolatilizer. Representative of such art are U.S. Pat. No. 3,694,535 issued Sep. 26, 1972 which teaches a single annular distributor device; U.S. Pat. No. 4,934,433 issued Jun. 19, 1990 which teaches a single "serpentine" distributor which replaces the conventional shell and tube heat exchanger in a falling strand devolatilizer, U.S. Pat. No. 5,118,388 issued Jun. 2, 1992 which discloses a single "candy scoop" distributor for a falling strand devolatilizer; and U.S. Pat. No. 5,069,750 issued Dec. 3, 1991 which teaches a single distributor tray for use in a falling strand devolatilizer. None of the above references teach an array of trays nor do they teach the type of tray which may be used in accordance with the present invention.

U.S. Pat. No. 3,747,304 issued Jul. 24, 1973 discloses a foam reduction means for treating hydrocarbon streams (typically oil or partially refined oil) in a separator drum to remove entrained vapor such as air. The separator drum is operated under pressure, rather than vacuum. While the drum contains an array of trays, the trays are designed to permit the liquid to flow from the tray and the foam to be retained upon the tray. The whole objective of U.S. Pat. No. 3,747,304 is to permit the liquid portion of the stream to flow as rapidly through the drum as possible while retaining the foam on the trays. The trays in the array according to the present invention do not contain an under flow weir to retain the foam and permit the non-foamed polymer to flow through the devolatilizer. The whole intent and essential feature of the design of the 304 patent teaches away from the subject matter of the present invention.

U.S. Pat. No. 3,886,049 issued May 27, 1975 is most intriguing. The patent discloses and claims a process for the recovery of aromatic monomer from polymers. In the process, a falling strand devolatilizer is used. However, there are no distributor trays in the vacuum chamber. Rather two vacuum chambers are used in series. More importantly there is a separator, downstream from the devolatilizer, to separate dimers and trimers from the aromatic monomer. The patent is interesting in that the patentee was likely aware of the art of the 304 patent but did not consider it useful in a devolatilizer and only used the art in the separation of the monomer from the heavy dimer/trimer organic phase. Clearly, although the art was available relating to the use of offset weirs in the refining and separation arts, the patentee of the 049 patent did not consider this art to be relevant to the devolatilization art field and particularly to the use of distributor trays in a falling strand devolatilizer.

The present invention seeks to provide a polymer devolatilizer tray and an array of devolatilizer trays which may be used in falling strand devolatilizers to improve the efficiency of the removal of monomer and diluent if present

BRIEF DESCRIPTION OF THE DRAWINGS

In the figures, like parts are designated by like numbers.

SUMMARY OF THE INVENTION

Figure 1:
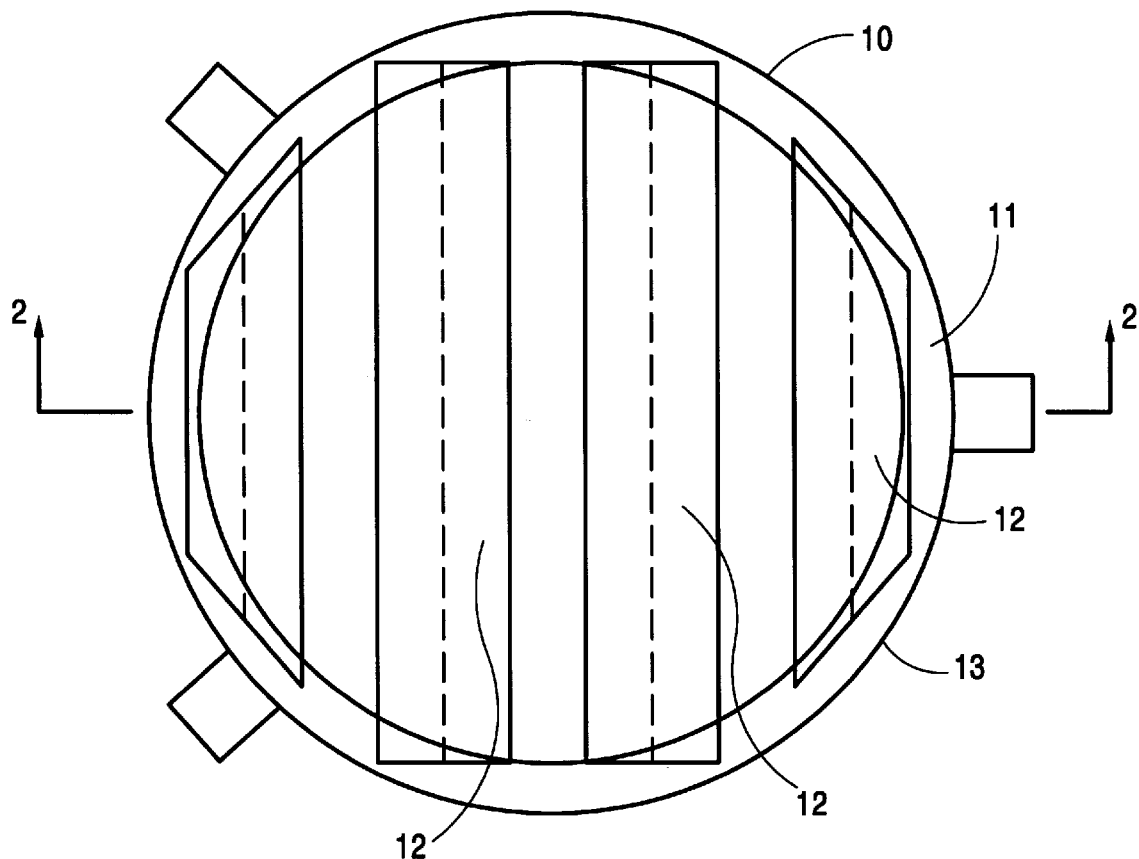
FIG. 1 is a schematic top view drawing of a single-level "angle iron" tray.

Accordingly, the present invention provides a process for reducing the residual monomer content in a melt of one or more thermoplastic polymers comprising heating said melt to a temperature from 200° to 270° C. and passing the polymer in the form of strands through a devolatilization chamber maintained at a pressure of less than 45 torr and causing the polymer melt to impact on an array of two or more devolatilizer trays having a base and a continuous rim of a height to prevent overflow of the tray and having gaps comprising from 15 to 50% of the surface area of each tray, said trays being spaced from 5 inches to 10 feet apart and being offset so that gaps in the upper tray are positioned over the solid areas of the tray below.

The present invention further provides a devolatilizer tray comprising the angle iron spaced apart about half of the distance of the base of said angle iron, and said rim has a height equal to 1 to 1.5 times the vertical height of the angle iron above the base.

The present invention further provides an array of two or more devolatilizer trays having a base and a continuous rim of a height to prevent overflow of the tray and having gaps comprising from 15 to 50% of the surface area of each tray, said trays being spaced from 5 inches to 10 feet apart and being offset so that gaps in the upper tray are positioned over the solid areas of the tray below.

DETAILED DESCRIPTION

In the bulk or solution polymerization of a number of monomers containing one or more vinyl aromatic monomers, the monomers are fed to one or more reactors where they are polymerized to at least about 65%, preferably greater than about 75%, most preferably greater than about 85% conversion. The polymer leaves the reactor, in the case of a tower process as illustrated by U.S. Pat. No. 3,658,946, issued Apr. 25, 1972, assigned to BASF, and in the case of a horizontal reactor process (i.e. McCurdy process) as illustrated in U.S. Pat. No. 3,660,535 issued May 2, 1972 assigned to The Dow Chemical Company, or in the case of a Monsanto-type process as illustrated by U.S. Pat. No. 3,903,202 issued Sep. 2, 1975 assigned to Monsanto, leaves the last reactor and passes through a preheater. The preheater heats the polymer melt to a temperature of from 200°. to 270° C. The vapor pressure of the volatiles increases and the viscosity of the melt is reduced. An additional problem which must be considered is the cooling of the polymer melt due to the latent heat of vaporization of the volatiles as the melt flashes in the devolatilizer.

Typically the melt is a melt of one or more polymers selected from the group of polymers including polystyrene, high impact polystyrene (HIPS), styrene acrylonitrile polymers (SAN), styrene maleic anhydride polymer (SMA), acrylonitrile butadiene styrene polymers (ABS), styrene methyl methacrylate polymers (SMMA), and butadiene styrene methyl methacrylate polymers (MBS), and blends of one or more of the aforesaid polymers, most preferably high impact polystyrene blended with polyphenylene oxide (PPO).

Generally, the polymers which may be treated in accordance with the present invention comprise:

(i) from 100 to 30, preferably from 100 to 50, most preferably from 100 to 70 weight % of one or more monomers selected from the group consisting of $C_{-8-12}$ vinyl aromatic monomers which are unsubstituted or substituted by a $C_{1-4}$ alkyl radical; and (ii) from 0 to 70, preferably 0 to 50, most preferably from 0 to 30 weight % of one more monomers selected from the group consisting of $C_{1-4}$ alkyl esters of acrylic or methacrylic acid; acrylonitrile and methacrylonitrile; which polymers may be grafted on to from 0 to 40, preferably from 0 to 20, weight % of one or more rubbery polymers selected from the group consisting of co- or homopolymers of one or more $C_{4-6}$ conjugated diolefin monomers; and polymers comprising from 20 to 80, preferably from 40 to 60, weight % of one or more $C_{8-12}$ vinyl aromatic monomers and from 80 to 20, preferably from 60 to 40 weight % of one or more $C_{4-6}$ conjugated diolefins.

Suitable vinyl aromatic monomers include styrene, alpha-methyl styrene, and p-methyl styrene. Suitable esters of acrylic or methacrylic acid include methyl methacrylate, ethyl methacrylate, methyl acrylate, ethyl acrylate, and butyl acrylate. Suitable conjugated diolefin monomers include butadiene and isoprene. Most preferably the polymer melt is polystyrene or high impact polystyrene (HIPS).

The present invention has been described in terms of the devolatilization of a polymer melt of polystyrene. However, the present invention may also be used in association with melts of other polymers such as acrylonitrile butadiene styrene polymers (ABS), styrene acrylonitrile polymers (SAN), and polymer blends. The present invention is particularly useful where polymers are solution blended. That is, miscible solutions of two polymers are mixed and the solvent(s) is/are removed. In such cases, it is often desirable to remove the solvent(s) to as low a level as possible.

One commercially available blend in which the present invention may be useful is a blend of polyphenylene oxide and polystyrene or a blend of polyphenylene oxide and high impact polystyrene. Typically, the weight ratio of polystyrene to polyphenylene oxide is from 95:5 to 5:95, preferably from 70:30 to 30:70.

The polymer melt should initially contain a total of not more than about 500, preferably less than about 300, typically from about 200 to 300 parts per million (ppm) of residual monomer and, if present, diluent. The polymer melt is fed to the preheater and heated to temperatures from 200° to 270° C., preferably from about 210° to 255° C., most preferably from about 225° to 235° C. The devolatilizer is maintained at comparable temperatures and operated at pressures below about 45 torr (1 torr=1 mm of Hg) or $5.999 \times 10^3$ Pa (1 torr=$1.333 \times 10^2$ pascals (Pa)), preferably below 20 torr ($2.666 \times 10^3$ Pa), preferably below 10 torr ($1.333 \times 10^3$ Pa), most preferably below about 8 torr ($1.066 \times 10^3$ Pa). The polymer melt descends out of the showerhead distributor as strands and impacts upon the first tray in the devolatilizer. Typically the path length from the exit point of polymer from the showerhead distributor to the first tray should be not less than at least 5 inches (12.7 cm). Preferably the distance will be in the order of feet (i.e. from 1 to 10, preferably from 3 to 6 feet (from 30.5 cm to 304.8 cm, preferably from 91.4 cm to 182.9 cm)).

Figure 2:
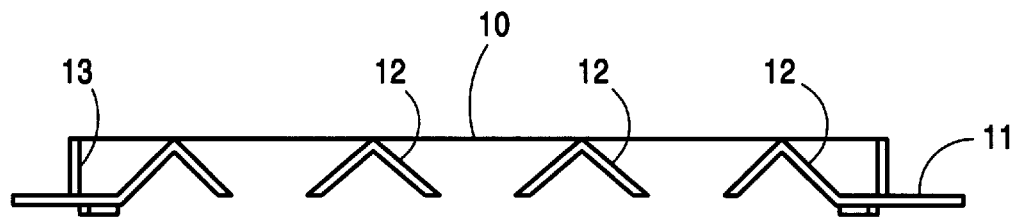
FIG. 2 is a schematic side view along line 2—2 of FIG. 1 of the single-level "angle iron" tray.

FIGS. 1 and 2 are a schematic top view and a sectional view, respectively, of a single-level "angle iron" tray useful in accordance with the present invention. The tray (10) comprises a base (11) and a number of angle irons (12) and a rim (13). The angle irons (12) are arranged in parallel rows with a spacing between the angle irons of about ⅓ to ½ of the width of the base of the angle iron. The height of the rim (13) may be equal to or about 1.5 times the height of the angle irons (12) above the base (e.g. the distance from the apex of the angle iron to its base). The angle iron may have a base from 2 to 2.5 inches and the distance between the angle irons may be from 1 to 1.25 inches. The height of the rim using these angle irons would be from 2 to 2.5 inches respectively. The trays as illustrated in the figures are circular as this is typically the shape of the cross-section of the devolatilizer column. However, other tray shapes could be used to conform to the cross section of the devolatilizer.

In view of the environment, the trays will typically be constructed of steel, preferably stainless steel.

Figure 3:
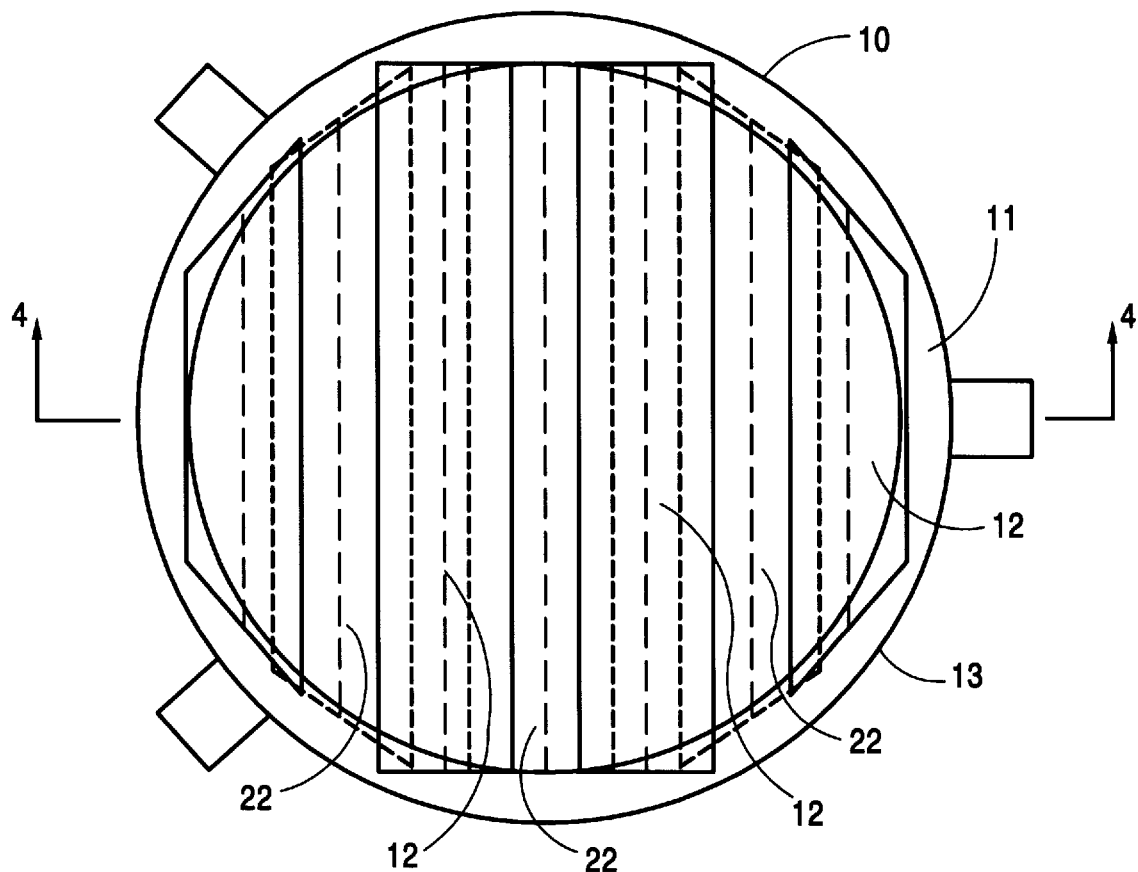
FIG. 3 is a schematic top view of a staggered two-level array of "angle iron" trays in which the lower "angle irons" are shown in broken lines.
Figure 4:
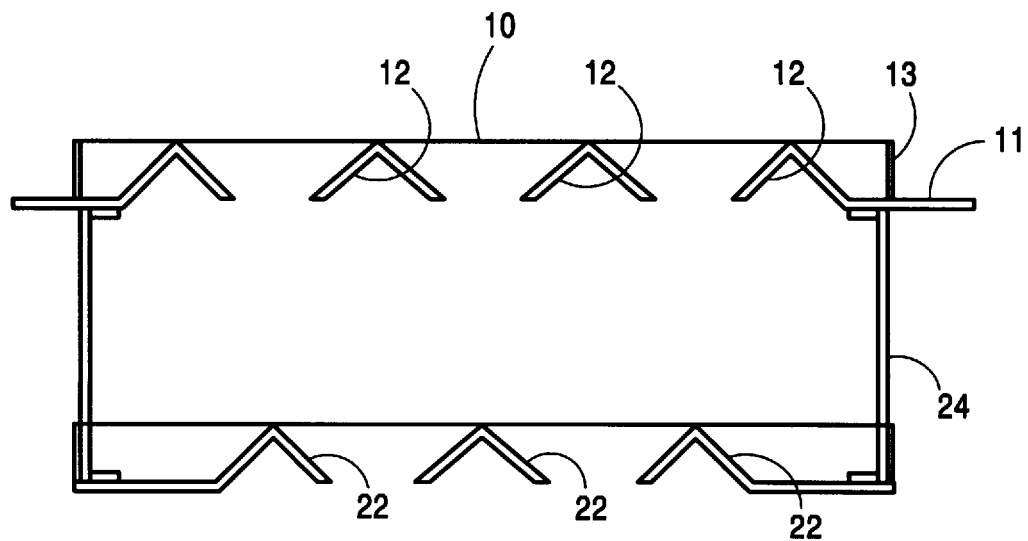
FIG. 4 is a schematic side view along line 4—4 of FIG. 3 of the staggered two-level array of "angle iron" trays.

FIGS. 3 and 4 are schematic top view and sectional views, respectively, of an array of two trays in accordance with the present invention. The array (10) comprises a base (11) and a rim (13). The angle iron members in the upper tray are as described above. Decsending from the base (11) is a support means such as a hanger or a solid or mesh wall. A second set of angle irons (22) is attached to the support means. The upper and lower rows of angle irons are offset so that the gaps in the upper layer are aligned with the upwardly facing backs of the angle irons below. As the rows of angle irons between the upper and next lower layer are offset, the number of angle irons in the trays adjacent to each other will typically differ by one (e.g. n rows in the upper layer and n-1 rows in the next lower layer (going back to n rows in the next lower layer)).

In practice two or more trays are arranged in a vertical array having a separation distance between the trays from about 5 inches to about 10 feet, typically from about 3 to 6 feet (12.7 cm to 304.8 cm, typically from 91.4 cm to 182.9 cm). The trays will be offset so that the gaps in the above tray will be spaced over the solid portions or peaks of the angle irons on the lower tray. For most applications the array may comprise two trays or three trays (quincunx pattern).

The polymer melt descends from the preheater, typically by a shower head type device and impacts on the upwardly facing backs of the angle irons (12) in the upper tray. While some polymer may drop between the gaps between the angle irons it will impact on the upwardly facing backs of the angle irons (22) in the next lower tray. The polymer melt which has impacted on the upwardly facing backs of the angle irons (12) in the upper tray (e.g. the land portion of the tray) flows over the surface of the angle iron (12) to an adjacent gap. This increases the residence time of the melt in the distributor and also may increase the surface area of polymer melt exposed to the reduced pressure in the devolatilizer. The polymer melt then descents and impacts on the upwardly facing backs of the angle irons (22) in the tray below. This again slows the passage of the polymer melt through the devolatilizer. This process is repeated depending on the number of trays in the array. From the bottom tray the polymer melt descends freely to the bottom of the devolatilizer and typically forms a pool. The optimum number of trays in an array may be determined by routine non-inventive experimental testing.

While the embodiments shown in FIGS. 3 and 4 disclose the lower tray attached to a support means attached to an upper tray, this is not necessary. For example, one could support multiple free trays from internal structures within the devolatilizer without having one or more adjacent trays connected to each other. The array would comprise two or more devolatilizer trays each having a base and a continuous rim of a height to prevent overflow of the tray and having gaps comprising from 15 to 50% of the surface area of each tray, said trays being spaced from 5 inches to 10 feet apart and being offset so that gaps in the upper tray are positioned over the solid areas or "lands" of the tray below.

While not described, as noted above, one concern is the latent heat of vaporization of the volatiles. To maintain the temperature of the polymer melt, it may be desirable to install a heating element below the solid portions of the trays. For example, a serpentine hot oil tubing loop could be run on the under side of the angle irons of the tray.

After passing through the array of trays, the polymer melt descends to the bottom of the devolatilizer and may form a pool. The polymer melt is then pumped through a die plate and extruded as continuous strands which typically are cooled by passing through a water bath. The strands are then dried and pelletized.

The present invention could be used with a number of other process improvements. For example, a fluid, such as water; a lower ($C_{1-4}$) alcohol; or even $CO_2$, could be injected into the polymer melt before it enters the devolatilizer as disclosed in U.S. Pat. No. 5,380,822 issued Jan. 10, 1995; U.S. Pat. No. 5,350,813 issued Sep. 27, 1994; and co-pending U.S. patent application Ser. No. 08/623,288 filed Mar. 28, 1996 respectively, the texts of which are herein incorporated by reference. These references teach that the fluid may be injected under pressure from about 1,000 to 5,000 psig into the polymer melt in amounts typically less than 2 weight % (based on the weight of the polymer), preferably less than 1,000 ppm, most preferably from 300 to 700 ppm, and thoroughly mixed, typically using a static mixer, into the melt which then is devolatilized. The entrained fluid "flashes" in the devolatilizer and carries with it residual monomer.

The present invention is illustrated by the following non limiting example in which, unless otherwise indicated, parts means parts by weight (e.g. grams) and percent means weight percent.

EXAMPLE 1

The experiments used a laboratory devolatilizer comprising a Berlyn (trademark) extruder and a devolatilizer chamber. Polystyrene pellets having a high residual styrene monomer content (approximately 1400 ppm) were produced for the study. The pellets were tumble blended for two hours to produce a uniform pellet feed for the experiments. The pellets were then fed to the extruder and melted at a temperature of about 225°–235° C. and fed into the devolatilizer at a comparable temperature. The polymer melt was forced through a showerhead distributor into the vacuum devolatilizer. The polymer feed rate for the examples was maintained at about 20 lb. per hour. The pressure in the devolatilizer was lowered from atmospheric (e.g. 760 torr) to less than about 8 torr. The strands from the showerhead distributor then fall to the internal trays. The polymer was devolatilized using one of a single tray, a staggered array of two trays, or an array of three trays offset (quincunx pattern). The resulting devolatilized polymer was then extruded as strands; cooled, dried and pelletized. The resulting pellets were then analyzed for residual styrene monomer content. The results of the experiment were statistically analyzed.

The results are as follows:

1. The feed polystyrene had a residual styrene content of 1400–1450 ppm;
2. With the single-level tray, the residual styrene monomer level is reduced to about 400 ppm;
3. With the staggered two-level tray as described above the residual styrene level is reduced to about 260 ppm; and
4. With an array of three trays (quincunx pattern) as described above, the residual styrene level is reduced to 150 ppm.

What is claimed is:

1. A process for reducing the residual monomer content in a melt of one or more thermoplastic polymers comprising heating said melt to a temperature from 200° to 270° C. and passing the polymer in the form of strands through a devolatilization chamber maintained at a pressure of less than 45 torr and causing the polymer melt to impact on a vertical array of two or more offset trays, said trays having a base and continuous rim of a height to prevent overflow of the tray, and having voids comprising from 15 to 50% of the surface area of each tray, said trays being spaced from 5 inches to 10 feet apart and being offset so that the voids in an upper tray are positioned over the solid areas of the tray below.

2. The process according to claim 1, wherein the temperature of said melt is from 210° to 255° C.

3. The process according to claim 2, wherein the pressure is less than 20 torr.

4. The process according to claim 3, wherein the distance between said trays is from 3 to 6 feet.

5. The process according to claim 4, wherein said melt is a polymer selected from the group consisting of polymers of:

(i) from 100 to 30 weight % of one or more monomers selected from the group consisting of $C_{8-12}$ vinyl aromatic monomers which are unsubstituted or substituted by a $C_{1-4}$ alkyl radical; and (ii) from 0 to 70 weight % of one more monomers selected from the group consisting of $C_{1-4}$ alkyl esters of acrylic or methacrylic acid; acrylonitrile and methacrylonitrile; which polymers may be grafted on to from 0 to 40 weight % of one or more rubbery polymers selected from the group consisting of co- or homopolymers of one or more $C_{4-6}$ conjugated diolefin monomers; and polymers of from 20 to 80 weight % of one or more $C_{8-12}$ vinyl aromatic monomers and from 80 to 20 weight % of one or more $C_{4-6}$ conjugated diolefins; and blends of such polymers with polyphenylene oxide.

6. The process according to claim 5, wherein said trays comprise angle iron spaced apart about half of the distance of the base of said angle iron and said rim has a height equal to 1 to 1.5 times the vertical height of the angle iron above the base.

7. The process according to claim 6, wherein the angle iron has a base from 2 to 2.5 inches and the spacing between angle irons being from 1 to 1.25 inches.

8. The process according to claim 7, wherein said array comprises two offset trays.

9. The process according to claim 7 wherein said array comprises three offset trays.

10. The process according to claim 1 further comprising injection into the melt of said polymer at a pressure from 1,000 to 5,000 psig of a fluid selected from the group consisting of water, $C_{1-4}$ alcohols and $CO_2$ in an amount less than 2 weight % based on the weight of the polymer.

11. The process according to claim 8 further comprising injecting into the melt of said polymer at a pressure from 1,000 to 5,000 psig, a fluid selected from the group consisting of water, $C_{1-4}$ alcohols and $CO_2$ in an amount less than 2 weight % based on the weight of the polymer.

12. The process according to claim 9 further comprising injection into the melt of said polymer at a pressure from 1,000 to 5,000 psig, a fluid selected from the group consisting of water, $C_{1-4}$ alcohols and $CO_2$ in an amount less than 2 weight % based on the weight of the polymer.

* * * * *